United States Patent
Vadimovitch et al.

(10) Patent No.: US 7,207,321 B2
(45) Date of Patent: Apr. 24, 2007

(54) FUEL DELIVERY SYSTEM

(75) Inventors: Andrei Vadimovitch, Gateshead (AU); James Richard Hunt, 27 Heshbond St., Gateshead NSW 2290 (AU)

(73) Assignees: Geoffrey Russell Turner, NSW (AU); Andrei Vadimovitch Shinkarenko, NSW (AU); James Richard Hunt, NSW (AU)

( * ) Notice: Subject to any disclaimer, the term of this patent is extended or adjusted under 35 U.S.C. 154(b) by 219 days.

(21) Appl. No.: 10/474,316

(22) PCT Filed: Apr. 9, 2002

(86) PCT No.: PCT/AU02/00453

§ 371 (c)(1),
(2), (4) Date: Jun. 3, 2004

(87) PCT Pub. No.: WO02/081895

PCT Pub. Date: Oct. 17, 2002

(65) Prior Publication Data

US 2004/0231618 A1    Nov. 25, 2004

(30) Foreign Application Priority Data

| Apr. 9, 2001 | (AU) | PR4344 |
| Jun. 19, 2001 | (AU) | PR5774 |
| Jun. 21, 2001 | (AU) | PR5879 |
| Sep. 13, 2001 | (AU) | PR7638 |
| Nov. 9, 2001 | (AU) | PR8791 |
| Dec. 24, 2001 | (AU) | PR9758 |
| Feb. 4, 2002 | (AU) | PR0310 |
| Feb. 18, 2002 | (AU) | PR0623 |

(51) Int. Cl.
*F02B 43/00* (2006.01)

(52) U.S. Cl. .................. 123/527; 123/27 GE

(58) Field of Classification Search ......... 123/525, 123/27 GE, 527
See application file for complete search history.

(56) References Cited

U.S. PATENT DOCUMENTS

| 4,463,734 A | 8/1984 | Akeroyd |
| 4,503,826 A | 3/1985 | Kessler et al. |
| 4,865,001 A | 9/1989 | Jensen |

(Continued)

FOREIGN PATENT DOCUMENTS

AU    703827 B    7/1996

(Continued)

OTHER PUBLICATIONS

Derwent Abstract Accession No. 2000-673329/66, Clas H06,M23, CN 1266885 A (MENG et al.) Mar. 12, 1999.

(Continued)

*Primary Examiner*—Tony M. Argenbright
*Assistant Examiner*—Katrina B. Harris
(74) *Attorney, Agent, or Firm*—Foley & Lardner LLP

(57) ABSTRACT

A fuel delivery system for supplying liquid gas fuel to an engine is disclosed. The fuel can be supplied solely to the engine or together with diesel fuel. The fuel delivery system includes an injector (20) for receiving the liquid gas, and for ejecting the liquid gas in vapour form to the engine E. A bubble preventing mechanism (40, 44, 48; 8, 203, 209, 208) is supplied for preventing the liquid gas from bubbling or boiling in the injector which would impair the ejection of fuel from the injector. The preventing means comprises cooling means which may use a coolant to cool the injector. In one embodiment, the coolant is in the form of bubbled vapour which is directed away from the injector (20) and enters a chamber (206) in which the injector (20) is located, so that the vapour cools the injector (20). The vapour (20) can pass to a vapour block (208) for supply to the intake air of the engine so the vapour is supplied back to the engine together with fuel ejected by the injector (20).

15 Claims, 8 Drawing Sheets

U.S. PATENT DOCUMENTS

| | | |
|---|---|---|
| 5,033,444 A | 7/1991 | Kaufman et al. |
| 5,076,244 A * | 12/1991 | Donaldson ............... 123/527 |
| 5,140,965 A | 8/1992 | Nogi et al. |
| 5,291,869 A * | 3/1994 | Bennett ............... 123/527 |
| 5,325,838 A * | 7/1994 | Bennett ............... 123/527 |
| 5,423,303 A | 6/1995 | Bennett |
| 5,444,628 A | 8/1995 | Meaney et al. |
| 5,673,668 A | 10/1997 | Pallett et al. |
| 2002/0007816 A1 | 1/2002 | Zur Loye et al. |

FOREIGN PATENT DOCUMENTS

| | | |
|---|---|---|
| AU | 741238 B | 8/1998 |
| CA | 2124535 A | 11/1994 |
| EP | 826872 A | 3/1998 |
| EP | 1 485 595 A1 | 12/2004 |
| GB | 2112457 A | 7/1993 |
| WO | WO 83/03120 | 9/1983 |
| WO | WO 89/00640 A | 1/1989 |
| WO | WO 89/04920 A | 6/1989 |
| WO | WO 01/34962 A | 5/2001 |
| WO | WO 03/074856 A1 | 9/2003 |

OTHER PUBLICATIONS

Derwent Abstract Accession No. 2001-375614/40, Class H05,CN 1288940 A (Chen) Sep. 17, 1999.

Derwent Abstract Accession No. 2001-317315/34, Class M23, CN 1283670A (Lui) Aug. 6, 1999.

Derwent Abstract Accession No. 2001-016840/03, Class H06,M23, CN 1267713 A (Zhao) Mar. 23, 1999.

Derwent Abstract Accession No. 2002-062914/09, Class H06,CN 1316489 A (Lu) Apr. 4, 2000.

* cited by examiner

FUEL DELIVERY SYSTEM

FIELD OF THE INVENTION

This invention relates to a fuel delivery system. In one embodiment this invention delivers liquid gas to a compression ignition engine for combustion with diesel fuel. In another embodiment this invention delivers a liquid gas to a spark ignition engine as a dedicated fuel. In this specification the term liquid gas means liquid petroleum gas, liquefied natural gas, mixture of methanol/ethanol and propane and butane in any quantities, and like fuels.

BACKGROUND ART

It is known that in order to reduce fuel consumption and cost of fuel, liquid petroleum gas can be supplied with diesel fuel to the cylinders of a diesel engine.

Australian patent application number 71909/00 discloses a fuel delivery system which successfully delivers liquid petroleum gas and diesel fuel to an engine at a controlled ratio to enable the engine to operate properly.

SUMMARY OF THE INVENTION

The present invention relates to further developments in relation to the delivery system which, whilst particularly suited for diesel engines, has application in other engines and also application in engines which employ both a spark ignition process or a compression ignition process.

The invention, in a first aspect, may be said to reside in a fuel delivery system for an engine including;
 fuel delivery means for delivery a first fuel to the engine;
 a second fuel delivery means for delivering liquid gas, concurrently with the first fuel, to the engine, the second delivery means having;
 an injector for injecting the liquid gas into the engine; and control means for controlling the injector.

It has been found that using an injector to deliver the liquid gas successfully delivers the liquid gas to the engine and can also provide for overcoming problems inherent with the delivery of gaseous fuels in combination with other fuel simultaneously to an engine.

In one embodiment the injector injects the liquid gas into the inlet manifold of the engine.

In one embodiment the means for delivery of the primary fuel to the engine also delivers the primary fuel to the inlet manifold of the engine or the cylinder of an engine.

In one embodiment the primary fuel is diesel and, in this case, the fuel is delivered to the cylinder of the engine.

In one embodiment the injector includes;
 an ejector body;
 a pintle, a bore in the ejector body for receiving the pintle, and a pintle seat defining an orifice which is closed by the pintle; and
 means for moving the pintle away from the seat so that liquid gas supplied to the injector body can exit the injector body through the orifice.

In one embodiment the means for moving the pintle comprises an electrical coil which is energised to move the pintle away from the seat.

In one embodiment biasing means is provided for biasing the pintle against the seat so that when the coil is energised the coil moves the pintle against the bias of the biasing means away from the seat.

In one embodiment the injector includes an injector housing, the injector body being located in the housing, the injector body having an opening in the form of an angled slot for allowing liquid gas to pass through the opening and into the bore.

Preferably the housing has an inlet opening for supply of liquid gas and, with the injector body, defines a chamber about the injector body so that liquid gas can flow into the chamber and then through the opening and into the bore.

In one embodiment the fuel delivery system has a collection system which comprises;
 means for collecting the vapour bubbles from the liquid gas which are generated when liquid gas is supplied to the injector;
 a liquid gas system for receiving the bubbles and for debubbling the liquid gas; and
 return means for returning the debubbled liquid gas in the form of vapour to the engine.

In one embodiment the delivery system has a conduit which leads upwardly from the injector to the system so that bubbles which naturally tend to rise will flow upwardly past the pintle to the collection system.

In one embodiment of the invention an engine control unit is provided which collects data relating to operating parameters of the engine for controlling the liquid gas injector.

The engine control unit may include the engine control system of the engine or a separate processing section.

In one embodiment the engine control unit receives information from one or more of;
 a fuel sensor for sensing the temperature of liquid gas for supply to the engine;
 a fuel pressure sensing means for sensing the pressure of the supply of liquid gas to the injector;
 an engine temperature sensing means for sensing the temperature of the engine;
 an air temperature sensing means for sensing the temperature of air delivered through an air inlet to the engine;
 a throttle position sensing means for sensing the position of an acceleration pedal;
 a cam angle sensor for sensing the position of a cam of the engine; and
 an engine inlet pressure sensing means for sensing the inlet air pressure to the engine.

In one embodiment the engine control unit receives parameters from some or all of the above-mentioned sensors and controls the liquid gas injector by supplying appropriate signals to the electrical coil in accordance with the data received from the sensors.

A second aspect of the invention relates to the structure of the liquid gas injector used in the invention.

This aspect of the invention may be said to reside in a liquid gas injector for injecting liquid gas into an engine, including;
 an injector body;
 a bore formed in the injector body, the bore having a pintle seat defining an orifice;
 a pintle arranged in the bore for seating against the pintle to close the orifice and moveable away from the pintle seat to open the orifice to allow liquid gas to be injected from the ejector;
 means for moving the pintle between a position removed from the pintle seat and a position seated against the pintle seat to selectively open and close the injector;
 an opening in the injector body communicating with the bore so as to enable liquid gas to enter the injector body through the opening and into the bore in a direction transverse to the pintle; and a passage through the injector body extending from the bore to an upper portion of the injector body for enabling bubbles to travel from the vicinity of the opening through the bore and passage to the upper portion of the injector body.

In one embodiment the controls means includes an electrical coil which is energised to pull the pintle away from the pintle seat and de-energise to enable the pintle to return to the pintle seat.

In one embodiment the injector includes biasing means for biasing the pintle against the pintle seat.

In one embodiment the passage includes an injector chamber arranged above the pintle and wherein bubbles created during the ejection of liquid petroleum gas from the injector are able to flow upwardly to the chamber.

In one embodiment the chamber is coupled to a liquid petroleum gas vapour system for receiving the bubbles and debubbling the liquid gas, and then returning the liquid petroleum gas to the engine.

In one embodiment of the invention the vapour system returns the debubbled liquid gas in the form of vapour to the engine. However, in other embodiments the vapour may be returned elsewhere.

A further aspect of the invention concerns debubbling of liquid gas which is supplied to the engine.

This aspect of the invention may be said to reside in a fuel delivery system of the engine including;
  liquid gas supply means for supplying liquid gas to the engine;
  collection means for collecting vapour bubbles of liquid gas which may be created upon supply of the liquid gas to the engine; and
  returning means for returning the vapour to an air intake of the engine.

This aspect of the invention may also be said to reside in an injector for delivery of liquid gas to an engine, including;
  an injector body;
  a bore in the injector body;
  a pintle seat formed in the bore and defining an office;
  a pintle arranged in the bore for seating against the pintle seat to close the orifice and prevent ejection of liquid gas through the orifice, and moveable way from the pintle seat to allow ejection of liquid gas through the orifice;
  control means for moving the pintle towards and away from the pintle seat; and
  a bubble flow path in the injector for collecting bubbles of a liquid gas which are created upon ejection of liquid gas from the injector.

In one embodiment the path includes;
  a chamber which is defined between the pintle and a wall defining the bore; and
  an upper collection chamber in the injector for receiving the bubbles for supply to a liquid gas vapour system.

In one embodiment the vapour system includes a conduit coupled to the upper chamber so that the bubbles can rise through the conduit from the upper chamber to the system where the bubbles are collapsed and returned to the engine inlet in a vapour state.

Preferably the injector housing includes a coolant outlet and a coolant inlet so that coolant can flow into the inlet, and therefore into the housing to surround the injector body, and out through the coolant outlet.

A further aspect of the invention addresses specifically the issues of bubbling or vaporisation of liquid gas when it is delivered to an engine by a fuel delivery system. In conventional liquid petroleum gas delivery systems which are used for delivering liquid to an engine, such as a conventional vehicle engine, or in combination with diesel fuel to a diesel engine, the liquid gas is supplied to the air intake of the engine where liquid gas vaporises and is drawn with the intake air into the cylinders of the engine for ignition. The application of liquid gas to the engine in this fashion is made necessary because the liquid gas is generally in a relatively cool state and under high pressure in the liquid gas tank and when the gas is supplied from the tank it vaporises at ambient temperature thereby making it virtually impossible to deliver the fuel to the engine other than by way of vapour.

Thus, the supply of liquid gas to the intake where it simply vaporises and is drawn into the engine with the intake air is a convenient way for supplying the fuel. The vaporisation of the fuel is in the form of a boiling of the fuel when the fuel leaves the cool and high-pressure environment of the fuel tank and is supplied to the air inlet. This vaporisation or boiling creates bubbles of fuel and we have found that this results in prior art systems not being able to handle delivery of this type of fuel, other than by way of simple delivery to the air intake where the vaporisation causes no difficulty. In this form of delivery, the fuel is simply sucked into the engine without any controlled delivery of the fuel to the engine. Thus, this form of supply of the liquid gas is relatively inefficient. Because of the relatively cheap cost of liquid petroleum gas fuel these insufficiencies have been tolerated in the past and have not created any particular difficulty. However, with the increasing cost of liquid petroleum gas fuel more efficient delivery systems are most desirable.

This aspect of the invention therefore provides a fuel delivery system for delivering liquid gas to cylinders of an engine, the fuel delivery system including;
  liquid gas supply means for supplying liquid petroleum gas;
  an injector for receiving the liquid gas from the supply means and for ejecting liquid gas in liquid form to the cylinders of the engine; and
  preventing means for preventing vaporisation or bubbling of the liquid gas in the injector so the liquid gas is ejected from the injector in liquid form.

In one embodiment of the invention the preventing means comprises cooling means for cooling the liquid gas so that the liquid gas delivered to the injector and ejected from the ejector is at a temperature below the temperature of the liquid gas in the liquid gas supply means so that the liquid does not vapouriser or bubble in the injector.

Preferably the cooling means includes a liquid gas delivery conduit for supplying liquid gas to the injector to cool the injector.

Preferably the injector includes;
  an ejector body for receiving liquid gas from the supply and for ejecting liquid gas from the injection body;
  a housing surrounding the injector body, the housing defining a chamber between the housing and the injector body; and
  the cooling means further including a coolant inlet opening in the housing and a coolant outlet opening in the housing, the inlet being coupled to a supply of coolant so that coolant can be supplied to the chamber and surround the injector body for cooling the injector body and therefore the liquid gas in the injector body.

Preferably the coolant is low pressure liquefied petroleum gas liquid, but any appropriate coolant may be used.

In one preferred embodiment of the invention, the preventing means includes debubbling means for removing any bubbles which occur in the liquid gas prior to supply to the injector.

Preferably the debubbling means is provided in combination with cooling means for cooling the liquid gas so that a liquid gas delivered to the injector is maintained at a low temperature to at least reduce the likelihood of bubbles or vaporisation occurring in the injector.

Preferably the injector is provided within a housing, the housing including a debubbling passage for enabling bubbles and vapour to rise, the injector being located in the housing below the passage, the passage being connected to a first debubbling mechanism for reducing the pressure of the bubbled and vaporised liquid gas, a conduit extending from the first debubbling mechanism to a second debubbling mechanism exterior of the housing for converting the liquid gas to a fully vapour state.

Preferably the injector communicates with the engine inlet and the second debubbling mechanism is connected to the engine inlet by a secondary conduit so that the injector delivers liquid gas sprayed from the injector and the second conduit delivers liquid gas in vapour form from the second debubbling mechanism.

This aspect of the invention may also be said to reside in a fuel delivery system for delivering liquid gas to cylinders of an engine, including;
  liquid gas supply means for supplying liquid gas;
  a plurality of injectors for receiving liquid gas from the supply means and ejecting liquid gas to the cylinders, and
  cooling means for cooling the liquid gas supplied to the injectors so the liquid gas is maintained at a temperature below the temperature of the liquid gas in the supply means to thereby prevent bubbling or vaporisation of the liquid gas when in the injectors so the liquid gas can be ejected in liquid form from the injectors.

A further aspect of the invention relates to the liquid gas system.

This aspect of the invention may be said to reside in a liquid gas system for receiving bubbles of liquid gas and converting the bubbles to liquid or vapour state for return to a collection point, including;
  a chamber for receiving the bubbles;
  a float in the chamber;
  a switch member coupled to the float;
  a co-operating switch member for activation by the switch member when the float is in a predetermine position;
  an outlet from the chamber;
  a valve for closing the outlet;
  wherein when bubbles enter the chamber the bubbles are able to collapse and return to a liquid or vapour state on which the float floats; and
  whereupon when pressure builds up within chamber because of the supply of bubbles to the chamber and collapsing of the bubbles to form liquid or vapour the float is pushed by the pressure to the predetermined position so that the switch member activates the corresponding switch member and opens the valve to allow the vapour to pass from the outlet for supply to the collection station.

In one embodiment of the invention the collection station may merely be the inlet manifold of the engine so that the vapour is returned to the engine from the vapour system after debubbling.

However, in other embodiments the vapour or liquid petroleum gas maybe returned to another location for use or for storage.

In one embodiment of the invention the valve comprises a solenoid valve which is activated by the sensor when the float is in the predetermined position so is to open the solenoid valve to enable the vapour to pass from the outlet.

In one embodiment the switch member comprises a magnet coupled to the float and the co-operating switch member comprises a sensor for sensing the magnet so that when the float is moved to the predetermined position the magnet is located adjacent to the sensor for activating the sensor to inturn open the valve.

The liquid gas used in all aspects of the invention referred to above may be liquid petroleum gas or compressed liquefied natural gas.

If compressed natural gas is used preferred embodiments of the invention further include, prior to the fuel delivery system;
  heat exchange means for receiving the compressed natural and for cooling the compressed natural gas;
  pressure reducing means for reducing the pressure of the compressed natural gas prior to delivery of the compressed natural gas to the fuel delivery system.

A filter may be provided between the heat exchanger and the pressure reducing means.

A further aspect of the invention is directed to a fuel and also a fuel delivery system for two-stroke engines.

This aspect of the invention may be said to reside in a fuel including liquid gas mixed with oil.

Preferably the liquid gas comprises liquid petroleum gas and the oil is two-stroke oil.

In this preferred embodiment of the invention, the mixture of the liquid petroleum gas and oil can be injected into a two-stroke engine, and has the advantage that the liquid petroleum gas vaporised upon injection into the engine allowing "dry" oil to coat mechanical parts of the engine for lubricating purposes. The vaporised liquid petroleum gas can be drawn into the chamber of the two-stroke engine for combustion.

This aspect of the invention may also be said to reside in a fuel delivery system as previously described, and wherein the fuel comprises a mixture of liquid petroleum gas and two-stroke oil.

Preferably the injector used in this aspect of the invention includes a bleed off line which is heated by engine heat and arranged to bleed off any build up of oil in the injector.

Preferably the bleed off line communicates with a crankcase of an engine in which the fuel delivery system is installed.

The invention also provides a fuel including an alcohol mixed with a liquid hydrocarbon that vaporises readily at standard temperature and pressure.

Preferably the alcohol is methanol or ethanol and wherein the liquid hydrocarbon is butane or propane.

Preferably the fuel includes water.

BRIEF DESCRIPTION OF THE DRAWINGS

A preferred embodiment of the invention will be described, by way of example, with reference to the accompanying drawings in which.

DESCRIPTION OF THE PREFERRED EMBODIMENTS

Figure 1:
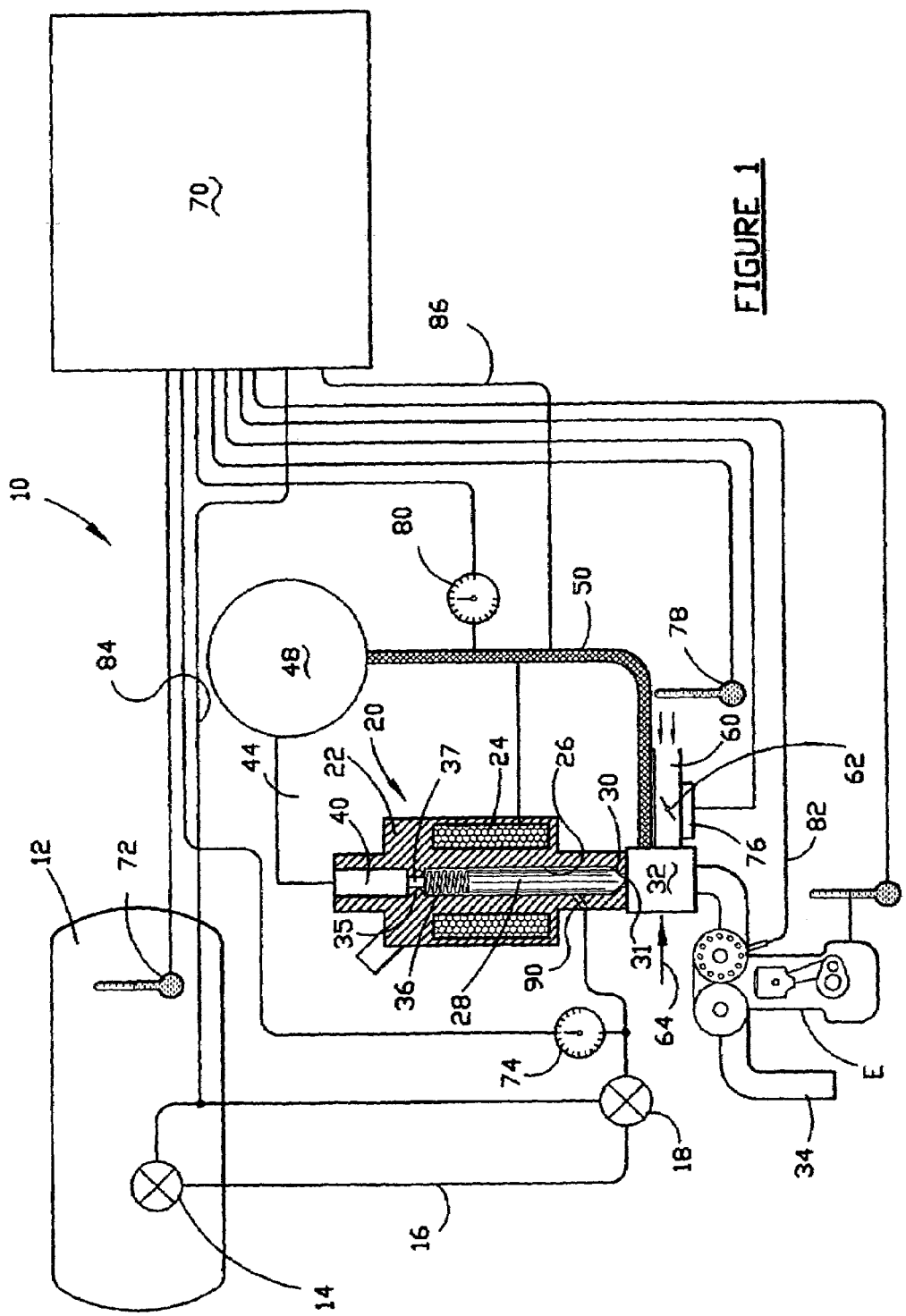
FIG. 1 is a general schematic diagram of one embodiment of the invention; this embodiment maybe used on spark ignition or compression ignition engines.

With reference to FIG. 1 a fuel delivery system 10 is shown which includes a liquid petroleum gas cylinder 12 for storing liquid petroleum gas. The cylinder 12 has a fuel shut-off valve 14 and an outlet line 16 for supplying liquid petroleum gas via a filter lock valve 18 to a liquid petroleum gas injector 20. The injector 20 has an injector body 22 in which an electrical coil 24 is arranged. The body 22 is provided with a bore 26 in which a pintle 28 is located.

The pintle 28 is a slightly loose fit in the bore 26. The bore 26 has a pintle seat 30 at its lower end which defines an orifice 31 to inlet manifold 32 of engine E. The engine E has an exhaust 34. The bore 26 has an upper end 35 and a spring 36 is located between the upper end 35 and the pintle 28 for biasing the pintle 28 against the pintle seat 30 so as to close the orifice 31 to the inlet manifold 32.

The injector body 22 has an injector chamber 40 which communicates with the bore 26 via a narrow passage 37 which extends from the end 35 to the chamber 40. The chamber 40 is connected to a rising bubble conduit 44 which in turn is connected to a liquid petroleum vapour system 48 which will be described in more detail hereinafter. The vapour system 48 has a vapour line 50 which extends from the system 48 back to the inlet manifold 32 for supplying vapour back to the inlet manifold 32 as will also be described in more detail hereinafter.

The inlet manifold 32 has an air inlet 60 in which is arranged a conventional throttle assembly 62 for a spark ignition engine. Throttle assembly 62 is deleted in the case of a compression ignition engine.

The system shown in FIG. 1 is controlled by an engine control unit 70 which can be the on board computer or engine control system associated with the engine E. Input parameters from the fuel system and engine are provided to the control unit 70 for processing and control purposes. A fuel temperature sensor 72 monitors the temperature of fuel in the liquefied petroleum gas cylinder 12. The pressure of delivery of fuel through the line 16 is monitored by a pressure sensor 74. The throttle position of the throttle assembly 62 is monitored by throttle position sensor 76 and temperature sensor 78 monitors the temperature of air travelling through the air inlet 60 to the inlet manifold 32. A further pressure sensor 80 monitors the pressure of the air at the inlet manifold 32 and an RPM and cam position sensor 82 measures engine revolutions as well as the position of a cam for controlling the inlet valves to the engine E.

The engine E control unit 70 also has output lines 84 for controlling the shut-off value 14 and output line 86 for supplying power to coil 24 of the injector 20.

The injector body 22 includes two angled slots 90 (only one shown) formed in its wall which communicates with the bore 26 to the orifice 31. A housing (not shown) surrounds the injector body 22 and has an inlet for receiving line 16 so that liquid petroleum gas can be supplied into the housing and then through the slots 90 to the bore 26 in a direction transverse to the pintle 26, for supply to the engine E. When the engine control unit outputs a pulse on line 86 to energise coil 24 the pintle 28 is pulled away from the pintle seat 30 against the bias of the spring 36 thereby opening the orifice 31. The liquid petroleum gas in the bore 26 is ejected from the injector body, into the inlet manifold 32 for supply to the engine E. When the control unit 70 removes the pulse from the line 86 the coil 24 is de-energised and the pintle 28 seats against seat 30 to close the orifice.

Bubbling of the liquid petroleum gas is created by the natural vaporisation or boiling of the liquid petroleum is gas which leaves the high pressure and relatively low temperature environment of the cylinder 12 and is supplied to a higher ambient temperature region. Thus, this change in temperature effectively enables the liquid petroleum gas to boil as it converts from a liquid state to a gaseous state. Thus, the liquid petroleum gas effectively enters from a direction transverse to the direction of the pintle 26 and movement of the pintle 26 rather than from a direction generally parrel with the pintle 26 as in conventional injector systems. Thus bubbles, which naturally tend to rise upwardly, will rise upwardly from the vicinity of the bore 26 passed the spring 36 and then through the narrow passage 37 into the injector chamber 40. The bubbles are then able to flow through the rising bubble conduit 44 to the converter 48.

The convertor 48 provides a relatively large volume chamber of low pressure and relative high temperature so that the bubbles which enter the convertor 48 can simply collapse and convert into a vapour state because of the relatively low pressure and higher ambient temperature. The vapour can then be supplied along conduit 50 to the air intake 32 of the engine E. Alternatively, the vapour could be conveyed to another environment where the vapour is stored for later use.

Figure 2:
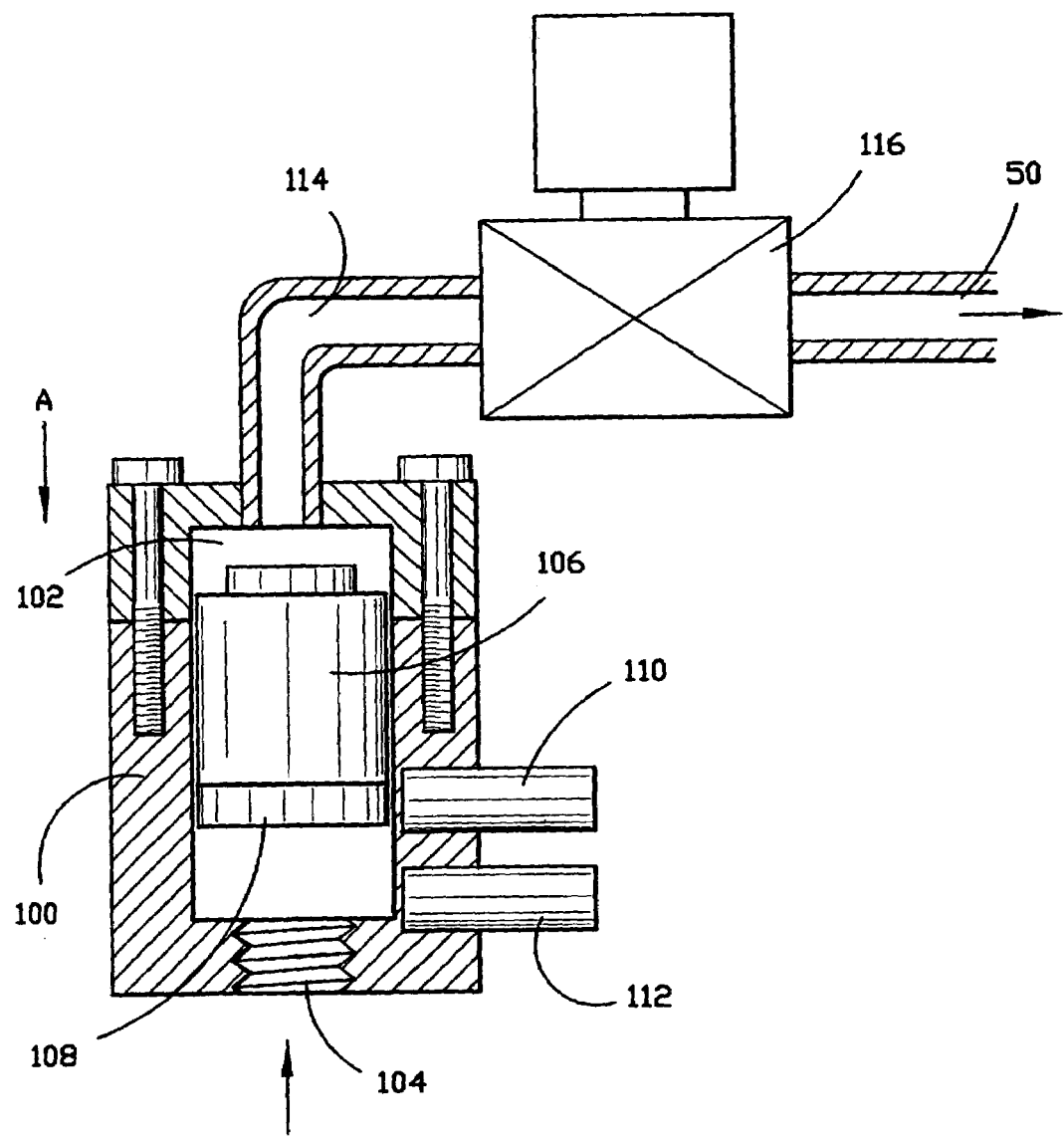
FIG. 2 is a more detailed view of one embodiment of a vapour system used in the embodiment of FIG. 1

The converter 48 may be replaced by a debubbling chamber as shown in FIG. 2 which comprises a housing 100 which defines a converter chamber 102. The housing 100 has an inlet 104 which connects to the conduit 44 so that the bubbles in the conduit 44 can enter the inlet 104 and pass into chamber 102. A float 106 is located in the chamber 102 and the float 106 carries a magnet 108 on its lower side.

A pair of proximity switches 110 and 112 are fixed to the housing 100 and are activated by the magnet 108 when the magnet 108 is moved to a position adjacent the respective switch 110 or 112.

When bubbles of liquid petroleum gas flow into the chamber 102 through the inlet 104 the bubbles are able to collapse and reform as liquid or vapour within the chamber 102. As pressure builds up due to the rising of the bubbles through the line 44 the vapour pressure which naturally tends to move above the liquid level will tend to push the float 106 downwardly in FIG. 2 in the direction of arrow A so the float moves from the position adjacent the switch 110 to a position adjacent the switch 112. When the magnet 108 is adjacent the switch 112 the switch 112 is activated.

The chamber 102 has an outlet 114 and a solenoid valve 116 is arranged in the outlet 114 for selectively opening and closing the outlet 114. The outlet 114 is then connected to line 50 which is shown in FIG. 1. When the magnet 108 is pushed by vapour pressure in the chamber 102 so that it is adjacent the switch 112, the switch 112 is activated as mentioned above and the activation of the switch 112 activates the solenoid valve 116 to open the valve 116.

Opening the valve 116 enables the vapour within the chamber 102 to pass through the valve 116 and to the vapour line 50 for return to the inlet manifold 32 and then for supply to the engine E. As vapour is released, the liquid level in chamber 102 is able to rise and the float 106 is able to return to the position shown in FIG. 2 and the switch 112 is deactivated. The magnet then is adjacent the switch 11.0 which then indicates a standby condition and the valve 116 is closed until the pressure again builds up to push the float 116 and magnet 108 to a position adjacent the switch 112.

Thus, this embodiment of the invention is able to cope with the creation of bubbles which are generated when liquid petroleum gas is ejected under pressure from the injector 20. The bubbles are able to be collected and debubbled and therefore returned as fuel to the engine.

In this embodiment of the invention, to reduce amount of vaporisation of the fuel being injected from the injector 20 to the engine E, the inlet manifold 32 is preferably cooled by a water passage or other coolant passage which extends through the inlet manifold 32. This maintains the inlet manifold 32 at a lower temperature and tends to protect the liquid petroleum gas fuel from the radiant heat of the engine E thereby maintaining the liquid petroleum gas primarily in a liquid state. The cooling passages through the inlet manifold 32 may connect to a vapour converter system of the type shown in FIG. 2 but which includes liquid cooling so that the cooling liquid is circulated from the vapour converter to the inlet manifold 32.

The sensor 80 which measures the pressure in the inlet manifold 32 provides a signal to the unit 70. The throttle position sensor 76 and the sensor 80, accounting for air temperature, are monitored by the unit 70 which in turn controls the amount of liquid petroleum gas liquid to be injected through the inlet manifold 32. Equal flushing of each injector of the engine injector of the engine is achieved through the first in last out principle by using equal distant path lengths from the pintle seat 30 to the vapour system 48 on each injector. The number of injectors for the liquid petroleum gas liquid injection system will depend on the number of cylinders for diesel engines, but not necessarily for spark ignition engines. The pulse width modulation for the injector which is supplied on line 86 to operate to coil 24 is controlled with reference to the engine load, RPM, temperature, inlet air temperature, fuel temperature, pressed throttle position, acceleration and deceleration transient boost air pressure, all of which are determined by the unit 70. The unit 70 in turn is programmed to provide, at all RPM settings, predetermined fuel quantities (diesel engines refers to the dg mixture) which are introduced in order to achieved the specified power curve, emission levels and economy. On diesel engines the cam angle sensor 82 provides time sequential injection. That is when the exhaust valve is open there is no liquid petroleum gas present, when it is closed and the inlet valve is open Liquid Petroleum Gas is introduced sequentially. The engine temperature is monitored to ensure that a cold temperatures the mixtures are correct as per the specifications of the unit 70 to ensure emissions controls are achieved.

In this embodiment of the invention the application of the vapour from the system 48 via line 50 flushes the tip of the pintle 28 adjacent the orifice 31 and also the vicinity of the orifice 31.

In the case of compression ignition systems time sequential injection from each injector 20 is provided such that no liquid petroleum gas is present in scavenging air. The sensor 80 is designed such that the signal it provides to the engine control unit in the form of an original equipment manufacture engine control unit, is modified for controlled diesel usage reduction. The sensor can be disabled if it is desired to run the engine using diesel fuel only rather than a mixture of diesel fuel and liquid petroleum gas.

A more preferred embodiment of the invention is described with references to FIGS. 3 to 6. In this embodiment rather than relying solely on collection of bubbles which are formed, the embodiment preferably prevents or at least greatly reduces the likelihood of the formation of, the bubbles in the first place thereby enabling the liquid petroleum gas to be ejected in liquid form from the injectors 20. In FIGS. 3 to 6 like reference numerals indicate like parts to those previously described.

In the embodiment of FIGS. 3 to 6 the liquid petroleum gas is supplied in an alternative way as will be described in detail herein below. Thus, in this embodiment the slots 90 need not be provided, or if provided so that a single form of injector 20 can be used with both the embodiments of FIGS. 1 and 2, and 3 to 6, the slots 90 are blocked off to prevent escape of liquid petroleum gas from the injector body 22. The liquid petroleum gas is delivered axially through the injector body 22 as is conventional, rather than transversely as in FIG. 1.

Figure 3:
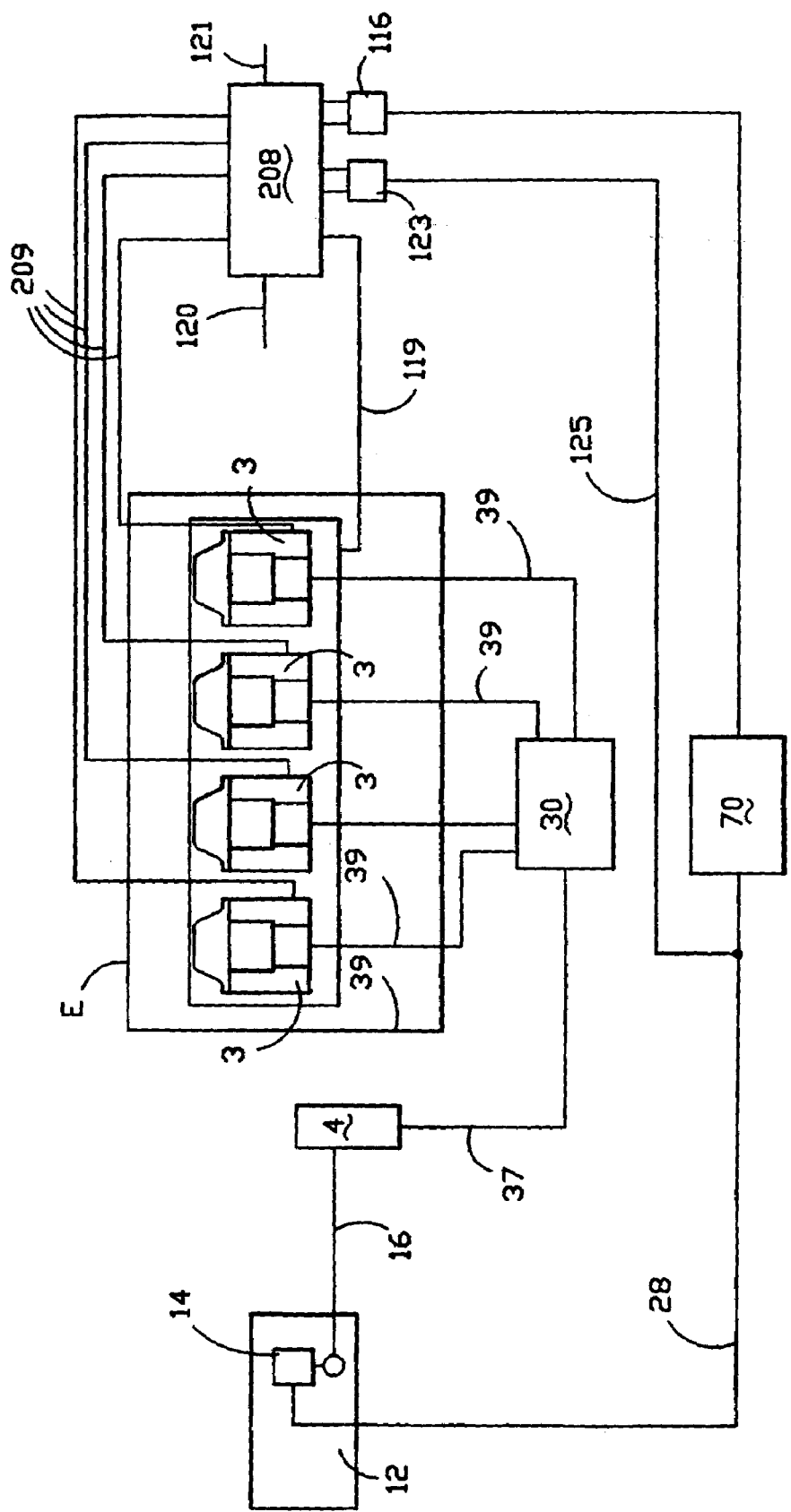
FIG. 3 is a schematic diagram of the preferred embodiment of the invention.

With reference to FIG. 3 liquid petroleum gas tank 12 supplies liquid petroleum gas via tank lock 14 to service line 16 and onto inline filter 4, the filtered liquid petroleum gas is then conveyed through service line 37 to distribution block 38. From the distribution block 38 the liquefied petroleum gas liquid flows through insulated delivery lines 39 to injector housings 3 (shown in more detail in FIGS. 4 and 5).

Figure 4:
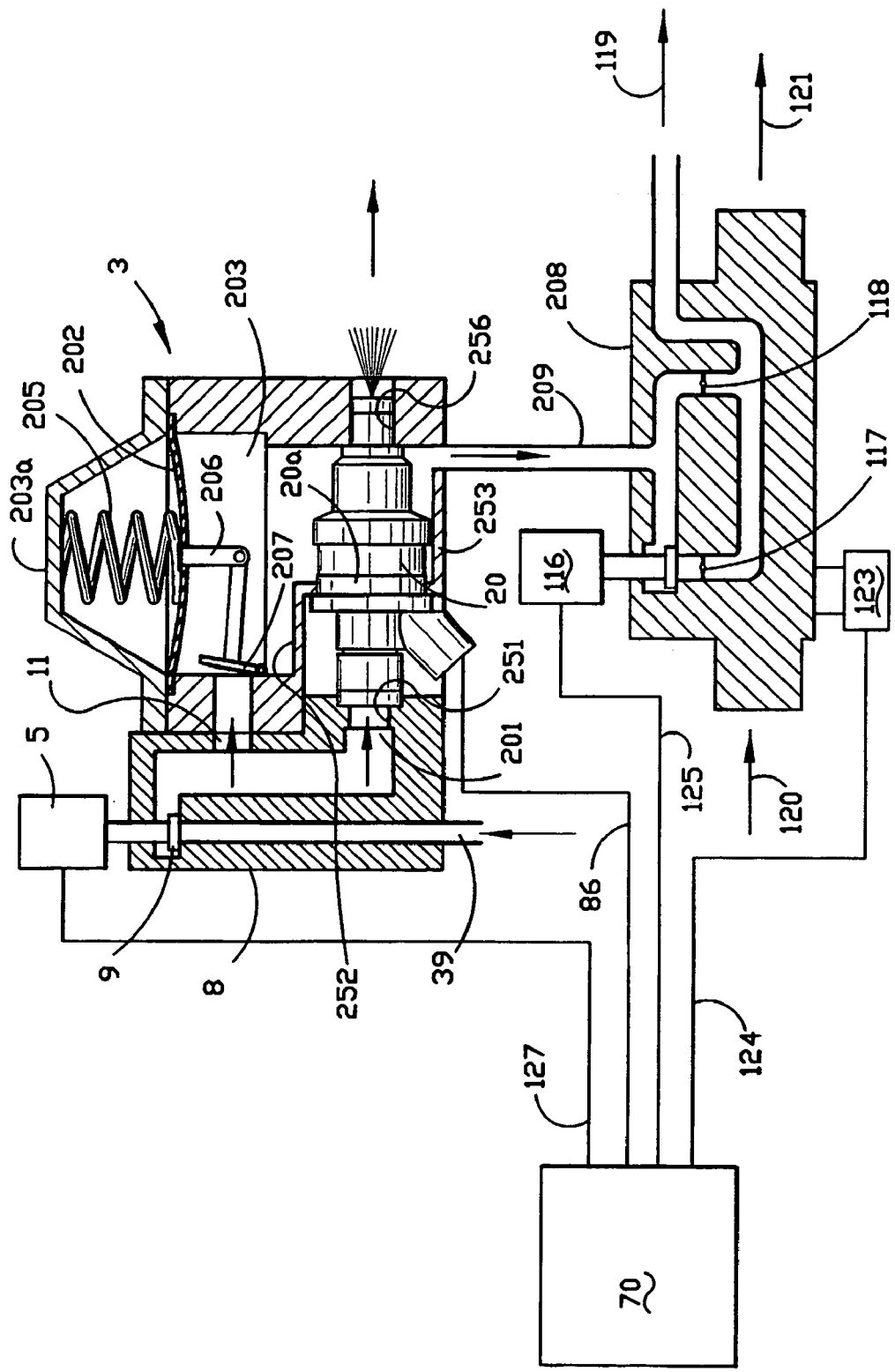
FIG. 4 is a detailed view of part of the embodiment of FIG. 3.

With reference to FIG. 4 the liquefied petroleum gas from lines 39 enter respective weir T pieces 8 of each housing 3. The liquefied petroleum gas flows upwards towards stop valve 9 which is controlled by stop valve solenoid 5. Stop valve solenoid 5 is open when energised by ECU 70 on circuit line 127.

When stop valve 9 is open liquefied petroleum gas liquid and vapour bubbles flow through stop valve 9 with the liquid dropping via gravity to injector inlet 201 and the bubbles rise to converter inlet 11.

As is apparent from FIG. 4, the injector housing 3 supports the injector 20 and also acts to draw away the bubbles from the injector inlet 201. The injector housing 3 also provides cooling of the injector 20 so as to maintain the fuel in the injector 20 in the liquid state and thereby prevents the fuel from converting into a boiling or bubble state while in the injector 20.

Figure 5:
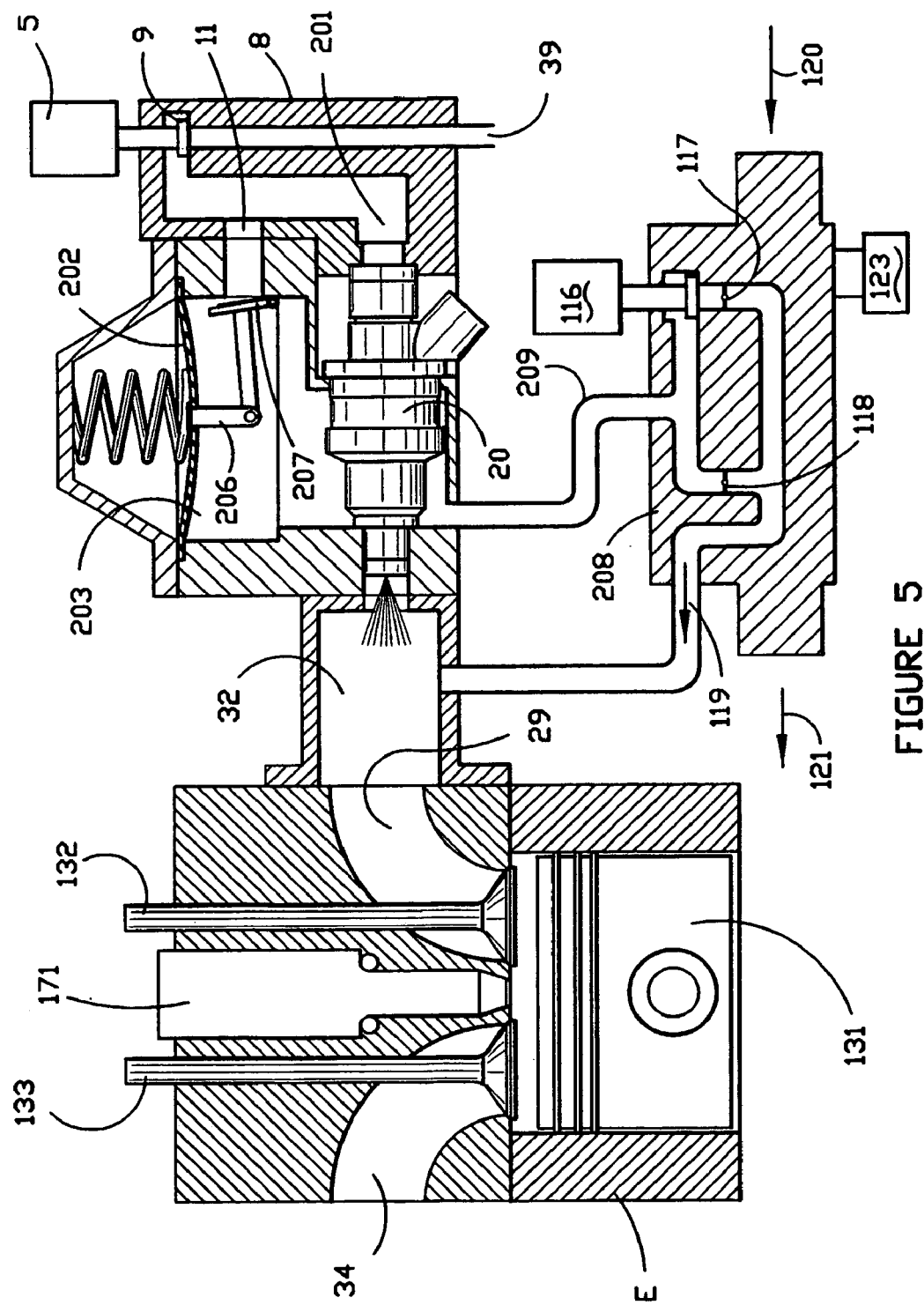
FIG. 5 is an assembled view of the items detailed in FIG. 4 attached to the manifold and thus cylinder head of a compressed ignition engine in the orientation that is preferred for correct operation.

With liquid at injector inlet 201 and a pulse width supplied from ECU 70 to injector 20 the liquid liquefied petroleum gas travels through the injector 20 and is ejected into manifold 32 (see FIG. 5), with the spray directed towards inlet port 29 (see FIG. 5). The injection of the liquefied petroleum gas is timed by the ECU 70 such that the pulse occurs after the closing of exhaust valve 133 (see FIG. 5) and before the closing of the inlet valve 132 (see FIG. 5), such that the downward action of piston 131 (see FIG. 5) can draw into engine E, all of the liquefied petroleum gas ejected with no blow-by passed exhaust valve 33.

As the liquefied petroleum gas drops over weir T piece 8 for supply of liquefied petroleum gas to injector inlet 201 any vapour bubbles present or formed rise to converter inlet 11 for pressure reduction in chamber 203 within the housing 3. The housing 3 has a cap portion 203a which is closed by a diaphragm 202. The diaphragm 202 forms one wall of the chamber 203 and the diaphragm 202 is biased inwardly of the chamber 203 by a spring 205. The diaphragm 202 carries a lever 206 which connects to a flat valve 207 which seals the inlet 11, dependent upon the pressure in the chamber 203. As is apparent from FIG. 4, the injector 20 is mounted in the chamber 203 and has an inlet 201 supported on a flat 251 and its mid-portion 20a sealed in wall structure 252 and 253 of the chamber 203. The outlet end of the injector 20 is sealed in bore 256 in the chamber 3 which is exposed to the inlet manifold 32 of the engine E.

The liquefied gas supplied through the weir T piece 8 to the inlet 11 is at a significantly higher pressure than the interior of the chamber 203, which pushes the valve 207 open against the diaphragm 202 and biases the spring 205, so that bubbles and vapour which occur in the liquid gas supplied to the inlet 201 will rise and flow into the inlet 11 and into the chamber 203. The reduced pressure within the chamber 203 allows the bubbles to collapse and with any liquid which enters the chamber 203, to turn to vapour thereby cooling the injector 20 which is exposed to the chamber 203. This cooling of the injector 20 ensures that the liquid petroleum gas which enters the inlet 201 is maintained in a liquid state because of the cold state of the injector 20, and does not convert to vapour in the injector 20, which would impair operation of the injector 20 and prevent proper ejection of fuel from the injector 20. Should the pressure in the chamber 203 rise to a pressure above the liquid petroleum gas at the inlet 11, the diaphragm 202 is pushed upwardly in FIG. 4 against the bias of the spring 205, which causes the lever 206 to close the flat valve 207 against the inlet to prevent further entry of bubbles and vapour into the housing 203 until the pressure in the housing 203 has decreased by egress of liquid petroleum gas from the housing 203 via outlet conduit 209. Thus, the reduced pressure vapour and liquid in chamber 203 has a cooling effect on the housing 3 and injector 20. This cooling effect is required to reduce the likelihood of liquefied petroleum gas vaporisation within the injection system and, in particular, in the injector 20. After the housing 3 and injector 20 are sufficiently cooled such that vaporisation of the low pressure liquefied petroleum gas does not occur the remaining liquefied petroleum gas enters the conduit 209 and is conveyed to a vapour block 208. The block 208 contains an orifice 118. This orifice 118 restricts the flow of the liquefied petroleum gas creating a back pressure to control the quantity of liquefied petroleum gas vapour which enters the engine through conduit 119. The vapour block 208 has attached a hot water inlet 120 and a hot water outlet 121 and a bore (not shown) extends through the block 208 to heat the block so the fuel in the block 208 remains in a vapour state. The inlet 120 and outlet 121 are connected into the vehicle cabin heater circuit to maintain the block 208 at engine coolant temperature. Whilst the block 208 is at engine coolant temperature it is not possible for low pressure liquefied petroleum gas to remain in liquid form, preventing an inadvertent supply of liquefied petroleum gas through the block 208 so only vapour is supplied to the engine by the conduit 119.

In another embodiment the block 208 may also be fitted with a second stage orifice 117 and an electrical solenoid valve 116 such that differing amounts of bleed vapour may be supplied to the engine by conduit 119. Solenoid 116 is controlled by ECU 70 through circuit 125.

Block 208 may also contain a coolant temperature sensor 123 which feeds back engine temperature information through circuit 124 to ECU 70.

Figure 6:
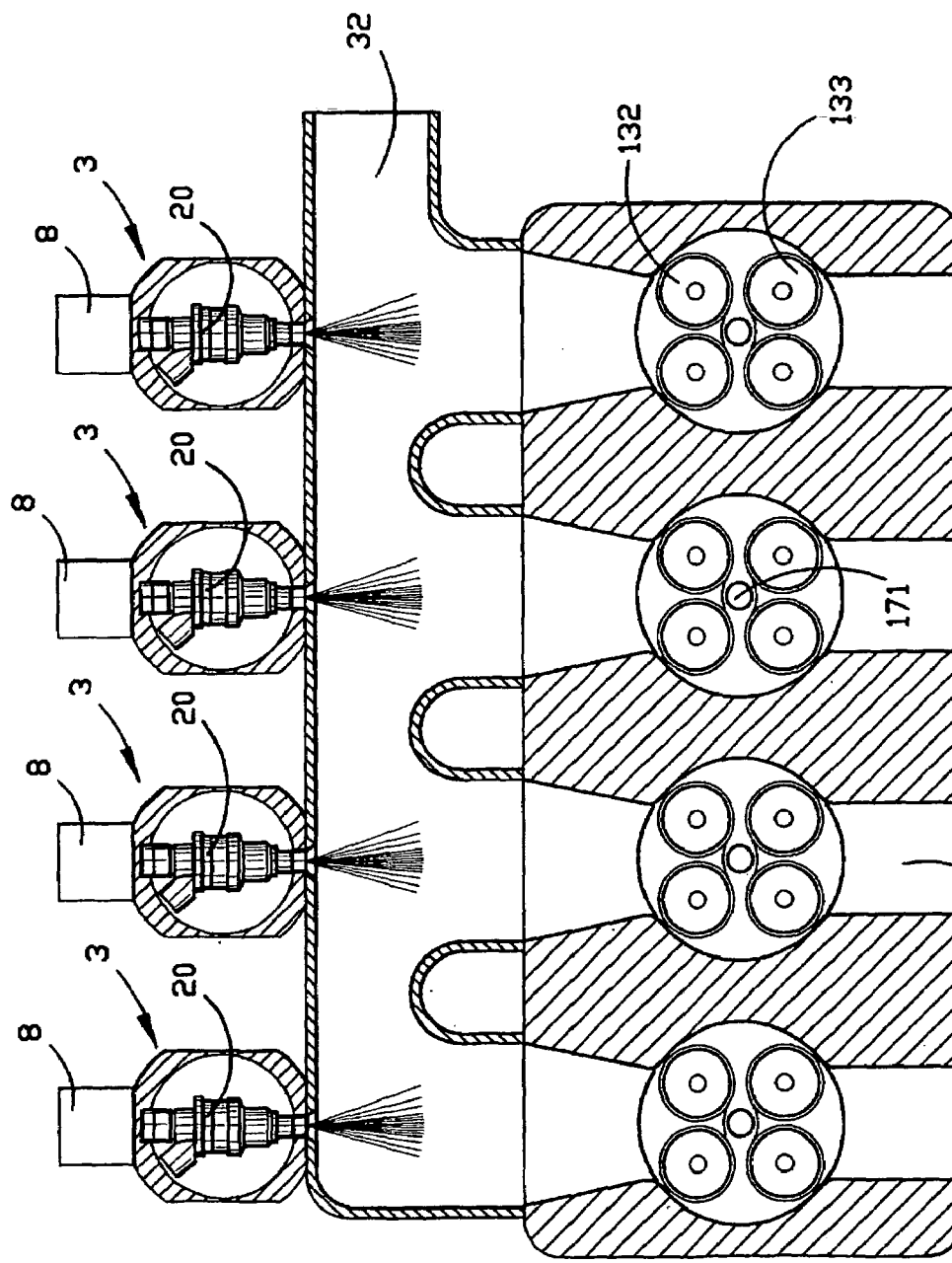
FIG. 6 is a top cross-sectional view showing four injection devices correctly aligned with the inlet ports of the cylinder head and attached to the inlet manifold

FIGS. 5 and 6 also show diesel injector 171 for supplying diesel fuel to the cylinders of the engine E concurrently with the supply of liquid petroleum gas via the injector 20 and the conduit 19. Thus, by supplying fuel in the form of liquid petroleum gas from the injector 20 and the conduit 119, the amount of diesel fuel which is required can be reduced, thereby increasing fuel economy compared to situations which would occur when only diesel fuel is supplied via the diesel injector 171.

Figure 7:
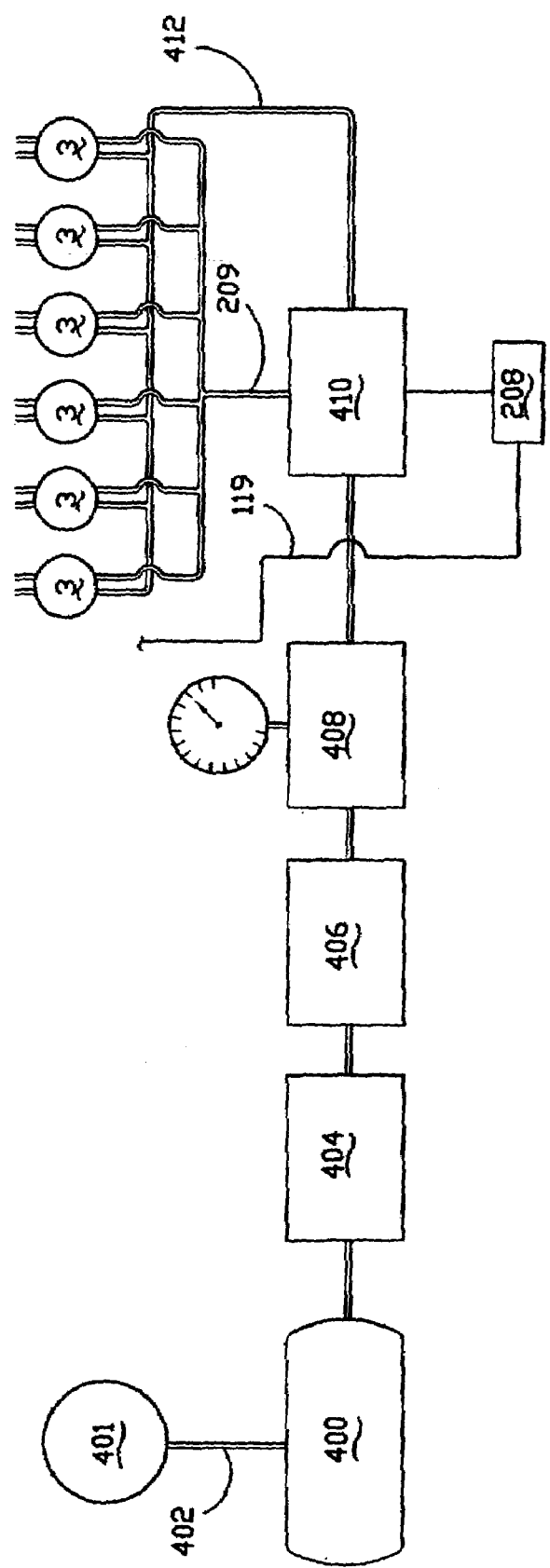
FIG. 7 is a schematic diagram of a still further embodiment of the invention specifically an embodiment for the supply of liquefied natural gas to the engine.

In FIG. 7 a standard compressed natural gas tank 400 is shown being filled from a compressed natural gas filling station 401 via a line 402. The compressed natural gas is typically at a pressure in the order of 3000 psi in the compressed natural tank which is mounted in a vehicle. The compressed natural gas from the tank 400 is supplied to an air conditioner heat exchanging unit 404 for reducing the temperature of the compressed natural gas supplied from the tank to maintain the compressed natural gas in a cold state. The compressed natural gas is then supplied to a filter 406 for removing contaminants for unwanted substances in the compressed natural gas and the compressed natural gas is then supplied to a pressure regulator 408 for reducing the pressure of the natural gas down to about 100 psi. Because the compressed natural gas has been cooled by the air conditioner 404, the pressure can be reduced to this level while still maintaining the compressed natural gas in a liquid state. The compressed natural gas is then supplied to a heat exchanger 410 and then passes through fuel line 412 to each of the housings 3, which are the same as the housings 3 described with reference to FIGS. 3 to 6. The housings 3 contain the fuel injectors 20 also in the manner previously described, and the injectors are cooled in the same manner as previously described so that the fuel in the injectors is maintained in a liquid state for injection from the injectors. Any bubbled fuel from the housing 3 passes through the heat exchanger 410 in conduit 209 to provide heat exchange with the fuel in the line 412 for assisting in maintaining the fuel in the line 412 cool. The line 209 then connects to a vapour block 208 which is the same as the vapour block 208 previously described. Vapour fuel leaves the vapour block via conduit 119 for delivery to the air intake of the engine in the same manner as previously described.

Figure 8:
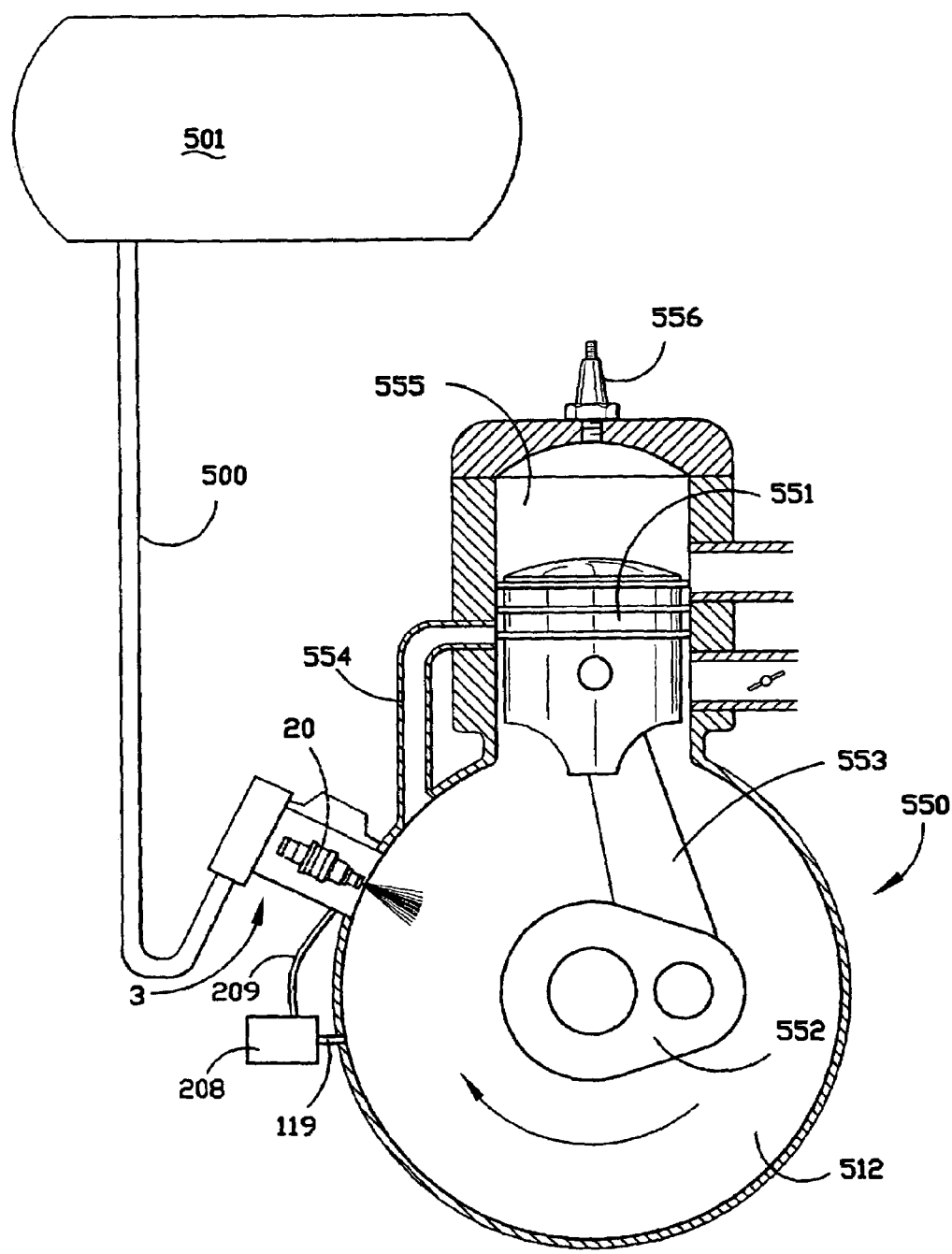
FIG. 8 is a view of a still further embodiment of the invention specifically an embodiment for the supply of fuel and lubricating oil to a two-stroke engine.

FIG. 8 shows a still further embodiment of the invention which is specifically adapted for two-stroke engines. In this embodiment of the invention, the fuel comprises a mixture of liquefied petroleum gas and two-stroke oil. The two-stroke oil is mixed with the liquefied petroleum gas and is miscible with the liquefied petroleum gas so that both liquefied petroleum gas and two-stroke oil are delivered through fuel line 500 from tank 501 to housing 3, which is of the same construction as the housing 3 described with reference to FIGS. 3 to 6. The injector 20 in housing 3 sprays the liquefied petroleum gas and two-stroke oil mixture into sump 512 of two-stroke engine 550. As is conventional, the engine 550 includes a piston 551 and a crank 552 which connect together by way of a connecting rod 553. A transfer port 554 enables fuel injected into the sump 512 to be drawn into chamber 555 for ignition by spark plug 556.

This embodiment has the advantage that since the fuel is a mixture of liquefied petroleum gas and two-stroke oil, as soon as the fuel is ejected from the injector 20, the liquefied petroleum gas immediately vaporises leaving a "dry" two-stroke oil component which can coat the operating parts of the engine 550 for lubricating purposes. The evaporated liquefied petroleum gas is pushed through the transfer port 554 for ignition in chamber 555. The fuel mixture also cools the mechanical parts as well as lubricating those parts.

Conduit 209 extends from the housing 3 in the same manner as in the embodiment of FIGS. 3 to 6. However, in this embodiment, the conduit 209 not only bleeds off vapour and liquid fuel which has debubbled in the chamber 203 of the housing 3, but also any two stroke oil which has built up in the chamber 203. The oil and fuel is supplied to a vapour block 208 which is the same as the vapour block 208 in the embodiment of FIGS. 3 to 8, except that no coolant is supplied through the vapour block in this embodiment because the two stroke engine does not have a liquid cooling system. Rather, the block 208 can simply be heated slightly by ambient engine temperature because of its proximity to the engine of FIG. 8. The fuel which enters the block 208 is converted to vapour form in the same manner as previously described, and the vapour fuel and any two stroke oil is supplied via conduit 119 to the sump 512 of the engine 550.

In other embodiments of the invention, the fuel used in the fuel delivery system for powering the internal combustion engine may be comprised of liquid petroleum gas and methanol/ethanol mixture in any ratio, liquid petroleum gas, methanol/ethanol and water in any ratio, and these two fuels further mixed with a two-stroke lubrication oil.

In other embodiments the fuel may comprise an alcohol such as methanol or ethanol, mixed with a liquid hydrocarbon that vaporises readily at standard temperature and pressure such as butane or propane. The fuel may include additional water to any water which is already present in the alcohol included in the fuel.

Since modifications within the spirit and scope of the invention may readily be effected by persons skilled within the art, it is to be understood that this invention is not limited to the particular embodiment described by way of example hereinabove.

The invention claimed is:

1. A fuel delivery system for delivering liquid gas to cylinders of an engine, the fuel delivery system comprising;
   liquid gas supply means for supplying liquid petroleum gas;
   an injector for receiving the liquid gas from the supply means and for ejecting liquid gas in liquid form to the cylinders of the engine;
   cooling means for cooling the liquid gas so that the liquid gas delivered to the injector and ejected from the ejector is at a temperature below the temperature of the liquid gas in the liquid gas supply means so that the liquid does not vaporize or bubble in the injector; and
   wherein the cooling means includes a liquid gas delivery conduit for supplying liquid gas to the injector to cool the injector.

2. The fuel delivery system of claim 1 wherein the injector includes;
   an ejector body for receiving liquid gas from the supply and ejecting liquid gas from the injection body;
   a housing surrounding the injector body, the housing defining a chamber between the housing and the injector body; and
   the cooling means further including a coolant inlet opening in the housing and a coolant outlet opening in the housing, the inlet being coupled to a supply of coolant so that coolant can be supplied to the chamber and surround the injector body for cooling the injector body and therefore the liquid gas in the injector body.

3. The fuel delivery system of claim 2 wherein the coolant is low pressure liquefied petroleum gas liquid.

4. The fuel delivery system of claim 1 wherein the preventing means includes debubbling means for removing any bubbles which occur in the liquid gas prior to supply to the injector.

5. The fuel delivery system of claim 4 wherein the debubbling means is provided in combination with cooling means for cooling the liquid gas so that a liquid gas delivered to the injector is maintained at a low temperature to at least reduce the likelihood of bubbles or vaporisation occurring in the injection.

6. The fuel delivery system of claim 1 wherein the injector is provided within a housing, the housing including a debubbling passage for enabling bubbles and vapour to rise, the injector being located in the housing below the passage, the passage being connected to a first debubbling mechanism for reducing the pressure of the bubbled and vaporised liquid gas, a conduit extending from the first debubbling mechanism to a second debubbling mechanism exterior of the housing for converting the liquid gas to a fully vapour state.

7. The fuel delivery system of claim 1 wherein the injector communicates with the engine inlet and the second debubbling mechanism is connected to the engine inlet by a secondary conduit so that the injector delivers liquid gas sprayed from the injector and the second conduit delivers liquid gas in vapour form from the second debubbling mechanism.

8. A fuel delivery system for delivering liquid gas to cylinders of an engine, comprising;
   liquid gas supply means for supplying liquid gas;
   a plurality of injectors for receiving liquid gas from the supply means and ejecting liquid gas to the cylinders;
   at least one housing in which the injectors are supported;
   an inlet in the or each housing for receiving bubbled liquid gas, and for enabling the bubbled liquid gas to surround the injector in the housing to cool the injector to thereby maintain the liquid gas in the injector in a liquid state;
   outlet means from the housing for supplying vapour from the housing;
   a vapour means for receiving the vapour from the housing and for maintaining or converting liquid gas to the vapour state for supply to the cylinders of the engine; and
   a pressure regulator for regulating the pressure of the vapour in the or each housing.

9. The fuel delivery system according to claim 8 wherein the pressure regulator comprises a diaphragm, a valve element supported by the diaphragm for closing the inlet, and biasing means for biasing the diaphragm and the valve element towards a closed position, so that when pressure builds up within the housing, the diaphragm is forced against the bias of the biasing means to move the valve element into a closed position, and when pressure reduces in the housing, the biasing means biases the diaphragm to move the valve element to open the inlet.

10. The fuel delivery system according to claim 8 wherein the vapour means includes a vapour block for receiving a heating medium for heating the block, a restrictor for restricting flow of vapour through the vapour block, and wherein the heating of the block ensures that the vapour in the vapour block is maintained in a vapour state, or any liquid fuel which enters the vapour block is converted to a vapour state, for supply from the vapour block to the cylinder of the engine.

11. A fuel delivery system for delivering liquid gas to cylinders of an engine, comprising:

a housing for receiving the liquid gas;

at least one injector mounted in the housing and having a liquid gas fuel inlet for enabling liquid gas to enter the injector, and a liquid fuel outlet for ejecting liquid gas from the injector to the cylinders of the engine;

a chamber in the housing and at least partially surrounding the injector for also receiving liquid gas to enable liquid gas to surround the injector to cool the injector for maintaining liquid gas in the injector in a liquid state for ejection from the injector;

an outlet from the chamber for allowing vapour and any liquid gas in the chamber to exit the chamber; and a pressure regulator for regulating the pressure of the vapour and liquid gas in the chamber.

12. The fuel delivery system of claim 11 wherein the outlet from the chamber is connected to a vaporising device for maintaining the vapour from the chamber in a vapour state and converting any liquid gas received from the chamber to the vapour state for delivery to the cylinder of the engine.

13. The fuel delivery system according to claim 11 wherein the liquid gas inlet in the housing comprises a first inlet which communicates with the liquid gas fuel inlet of the injector, and a second separate inlet for allowing the liquid gas to enter the chamber.

14. The fuel delivery system according to claim 11 wherein the pressure regulator regulates entry of liquid gas into the chamber to thereby regulate the pressure of the liquid gas in the chamber.

15. The fuel delivery system according to claim 11 wherein the pressure regulator has a diaphragm responsive to pressure within the chamber for regulating the pressure within the chamber.

* * * * *